United States Patent [19]

Dechellis

[11] Patent Number: 5,238,212
[45] Date of Patent: Aug. 24, 1993

[54] BEVERAGE CONTAINER SUPPORT

[76] Inventor: Don M. Dechellis, R.D. #4, Box 147-D, Ligonier, Pa. 15658

[21] Appl. No.: 950,190

[22] Filed: Sep. 24, 1992

[51] Int. Cl.$^5$ .............................................. A47K 1/08
[52] U.S. Cl. .................................. 248/311.2; 297/194
[58] Field of Search ............... 248/311.2, 313; 211/71; 297/194, 188; 108/25, 26

[56] References Cited

U.S. PATENT DOCUMENTS

| | | | |
|---|---|---|---|
| 215,515 | 5/1879 | Benedict | 267/262 |
| 352,675 | 11/1886 | Bowman | 267/262 |
| 3,690,724 | 9/1972 | Douglas | 297/194 |
| 4,190,284 | 2/1980 | Schmidhuber | 297/194 |
| 4,262,962 | 4/1981 | Yust | 297/194 |
| 4,548,326 | 10/1984 | Danna | 211/71 |
| 4,795,211 | 1/1989 | Stern | 248/311.2 X |
| 4,863,134 | 9/1989 | Young | 248/311.2 |
| 5,060,899 | 10/1991 | Lorence | 248/311.2 |

*Primary Examiner*—J. Franklin Foss
*Attorney, Agent, or Firm*—Leon Gilden

[57] ABSTRACT

An organization to receive an arm member of a chair therewithin, wherein the organization includes an elongate tubular body having a parallelepiped cavity, with the body including a support head. The support head and the body having coplanar top surface, with the body including a recess for positioning a beverage container therewithin. The cavity of the body includes spaced parallel side walls, with elongate springs arranged in confronting relationship relative to one another arranged to secure the arm of the chair within the cavity in secure orientation relative to the body.

1 Claim, 3 Drawing Sheets

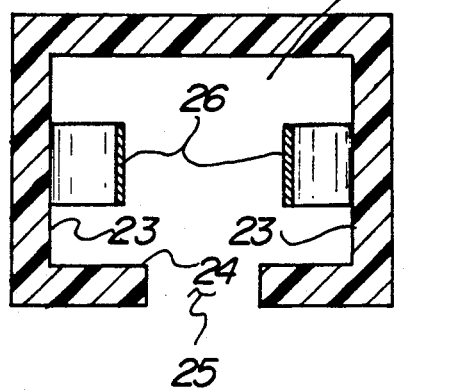
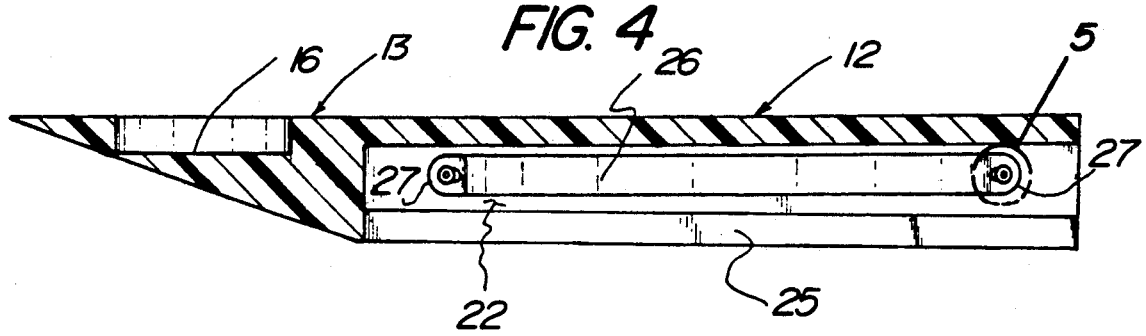

BEVERAGE CONTAINER SUPPORT

BACKGROUND OF THE INVENTION

1. Field of the Invention

The field of invention relates to beverage container structure, and more particularly pertains to a new and improved beverage container support wherein the same is arranged for mounting to a chair arm for supporting a beverage container.

2. Description of the Prior Art

Beverage containers of various types have been utilized throughout the prior art for the positioning and mounting of beverage containers relative to a chair construction such as exemplified in U.S. Pat. No. 3,675,960. Such further constructions are indicated in the U.S. Pat. Nos. 4,863,134; 4,795,211; and 4,728,147.

Accordingly, it may be appreciated there continues to be a need for a new and improved beverage container support as set forth by the instant invention which addresses both the problems of ease of use as well as effectiveness in providing for biased mounting of a chair arm within an elongate cavity of the construction and permitting ease of displacement of the springs relative to the cavity and in this respect, the present invention substantially fulfills this need.

SUMMARY OF THE INVENTION

In view of the foregoing disadvantages inherent in the known types of container support structure now present in the prior art, the present invention provides a beverage container support wherein the same permits the orthogonal orientation of a beverage container relative to a chair arm in its support. As such, the general purpose of the present invention, which will be described subsequently in greater detail, is to provide a new and improved beverage container support which has all the advantages of the prior art container support structure and none of the disadvantages.

To attain this, the present invention provides an organization to receive an arm member of a chair therewithin, wherein the organization includes an elongate tubular body having a parallelepiped cavity, with the body including a support head. The support head and the body having coplanar top surface, with the body including a recess for positioning a beverage container therewithin. The cavity of the body includes spaced parallel side walls, with elongate springs arranged in confronting relationship relative to one another arranged to secure the arm of the chair within the cavity in secure orientation relative to the body.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beverage container support which has all the advantages of the prior art container support structure and none of the disadvantages.

It is another object of the present invention to provide a new and improved beverage container support which may be easily and efficiently manufactured and marketed.

It is a further object of the present invention to provide a new and improved beverage container support which is of a durable and reliable construction.

An even further object of the present invention is to provide a new and improved beverage container support which is susceptible of a low cost of manufacture with regard to both materials and labor, and which accordingly is then susceptible of low prices of sale to the consuming public, thereby making such beverage container supports economically available to the buying public.

Still yet another object of the present invention is to provide a new and improved beverage container support which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 1 in the direction indicated by the arrows.

FIG. 4 is an orthographic view, taken along the lines 4—4 of FIG. 1 in the direction indicated by the arrows.

DESCRIPTION OF THE PREFERRED EMBODIMENT

Figure 1:
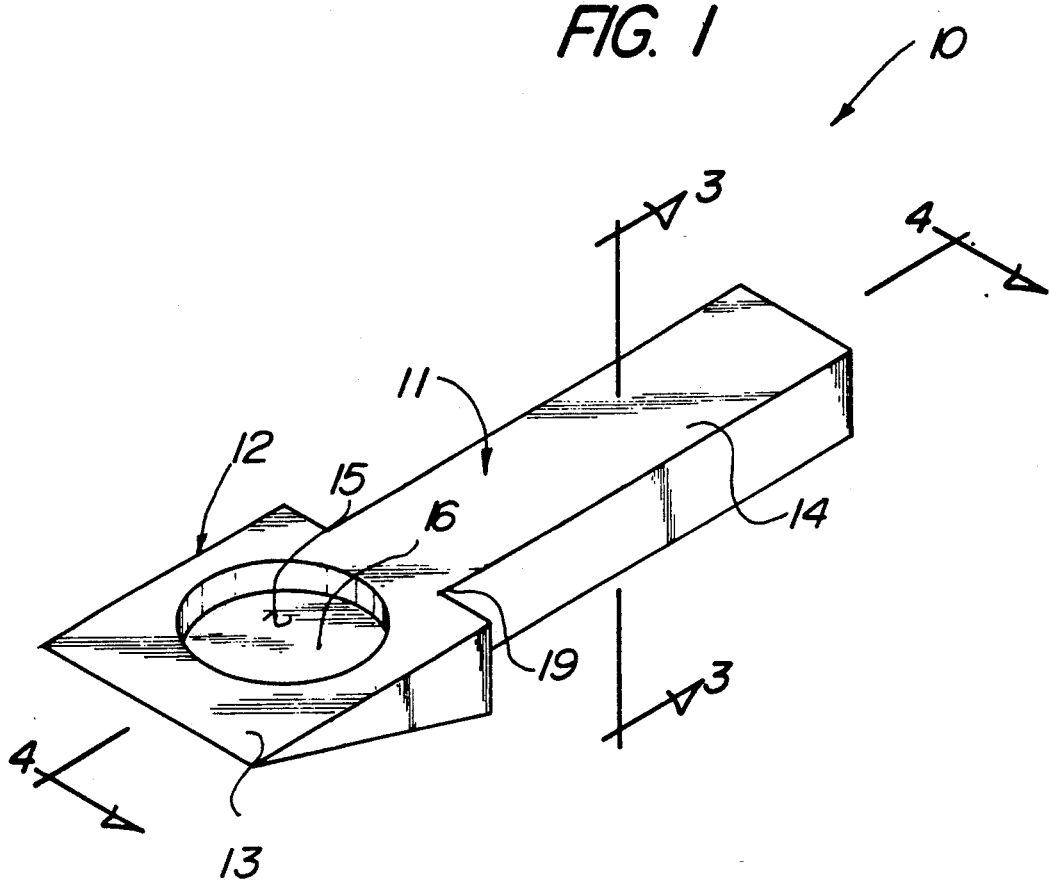
FIG. 1 is an isometric illustration of the instant invention.

With reference now to the drawings, and in particular to FIGS. 1 to 7 thereof, a new and improved beverage container support embodying the principles and concepts of the present invention and generally designated by the reference numeral 10 will be described.

Figure 2:
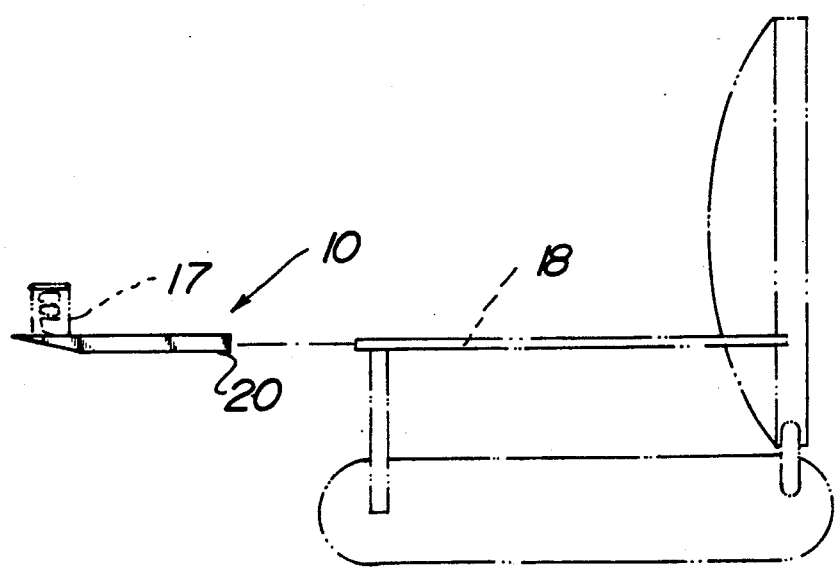
FIG. 2 is an orthographic side view of the invention in use.
Figure 5:
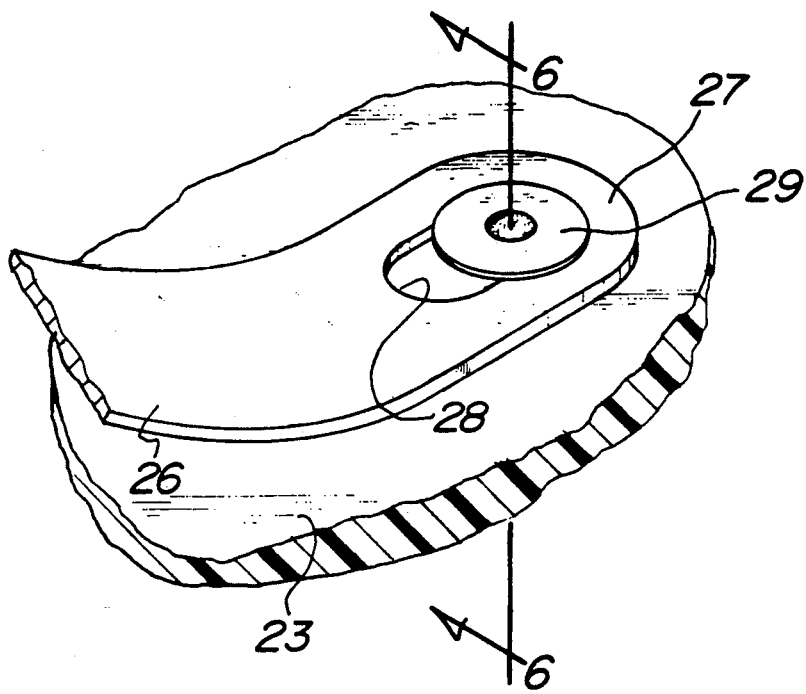
FIG. 5 is an isometric illustration of each end of each spring member mounted within the elongate cavity.
Figure 7:
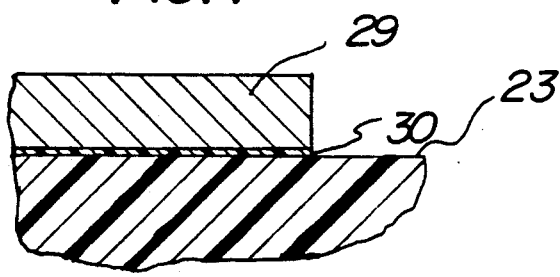
FIG. 7 is an enlarged orthographic view of section 7 as set forth in FIG. 6.
Figure 6:
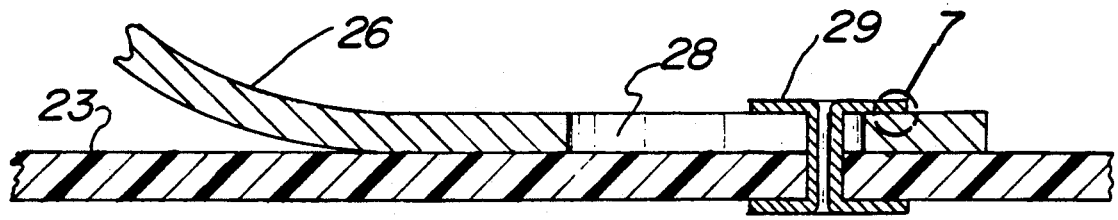
FIG. 6 is an orthographic view, taken along the lines 6—6 of FIG. 5 in the direction indicated by the arrows.

More specifically, the beverage container support 10 of the instant invention essentially comprises an elongate longitudinally aligned tubular body 11 having a body first end 19 spaced from a body second end 20 at opposed first and second distal ends of the body 11. A support head 12 is integrally mounted to the body first end 19, with the support 12 including a support head top planar wall 13 coplanar with a tubular body top planar wall 14. A cylindrical recess 15 is directed through the support head top planar wall 13 for receiving a beverage container 17, as indicated in FIG. 2, in a secured orientation.

The tubular body 11 includes an entrance opening 21 directed into the tubular body through the through the body second end 20 for communication with a parallelepiped cavity 22 longitudinally aligned with and coextensive with the tubular body 11. The cavity 22 includes cavity parallel side walls 23 and a cavity floor 24 having a floor slot 25 permitting ease of insertion of an instrument or the like through the slot to permit extraction and assistance thereof in the removal of a chair arm 18 that may be stuck within the body during use.

A plurality of leaf spring members 26 are arranged in a confronting, parallel and coextensive relationship mounted to the cavity parallel side walls 23 of the cavity 22. The leaf spring members 26 each include end plates 27 at each end of the spring members 26. Each of the end plates includes an elongate slot 28. The elongate slots 28 of each spring member 26 are longitudinally aligned and are each of a predetermined width, with a spring fastener 29 directed through the slot in a sliding relationship within the slot. Each spring fastener 29 includes a Teflon (R) web between the fastener and the respective leaf spring end plate 27 to permit ease of sliding of each of the end plates 27 relative to the leaf spring members 26 to accommodate flattening of the springs when the arm 18 is directed within the cavity 22.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A beverage container support for receiving an elongate chair arm therewithin, wherein the container support comprises, an elongate, longitudinally aligned tubular body having a body first end and a body second end, and a support head, the support head integrally mounted to the body first end, with the support head including a support head top planar wall and the tubular body having a body top planar wall, wherein the support head top planar wall and the body top planar wall are coplanar to minimize obstruction along the tubular body and the support head, and the support head top planar wall including a cylindrical recess having a recess floor, with the recess floor and cylindrical recess arranged for receiving a beverage therewithin, and the body second end including an entrance opening, and a parallelepiped cavity directed through the tubular body extending from the entrance opening for receiving the chair arm therewithin, and the parallelepiped cavity includes cavity parallel spaced side walls and a cavity floor, with the cavity floor including a floor slot coextensive with the cavity floor for access to the cavity, and the parallelepiped cavity includes a plurality of parallel spaced and coextensive leaf spring members arranged in confronting relationship, wherein each leaf spring member is mounted to one of said side walls within the cavity, and each of the leaf spring members includes a plurality of end plates at opposed ends of each leaf spring member, with each end plate slidably mounted on one of said side walls, and each end plate includes an elongate end plate slot, each end plate slot having a predetermined width, and a spring fastener, the spring fastener having a predetermined diameter greater than the predetermined width to slidingly receive and capture one of said end plates, with each fastener having a Teflon web mounted between said fastener and a respective one of said end plates.

* * * * *